(12) United States Patent
Despesse

(10) Patent No.: US 8,450,866 B2
(45) Date of Patent: May 28, 2013

(54) MICROMECHANICAL DEVICE FOR AMPLIFYING A VIBRATING MOVEMENT

(75) Inventor: Ghislain Despesse, Saint Egreve (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 54 days.

(21) Appl. No.: 13/378,505

(22) PCT Filed: Jun. 10, 2010

(86) PCT No.: PCT/EP2010/058185
§ 371 (c)(1),
(2), (4) Date: Dec. 15, 2011

(87) PCT Pub. No.: WO2010/149503
PCT Pub. Date: Dec. 29, 2010

(65) Prior Publication Data
US 2012/0091828 A1    Apr. 19, 2012

(30) Foreign Application Priority Data

Jun. 23, 2009 (FR) ...................................... 09 03020

(51) Int. Cl.
*F02B 63/04*    (2006.01)
(52) U.S. Cl.
USPC ..................................... 290/1 R; 73/514.01
(58) Field of Classification Search
USPC ............... 290/1 R; 310/15, 36, 12.01, 12.03; 73/514.01
IPC .............. B81B 3/0021,3/0037, 3/0051, 3/0078, B81B 7/0003, 7/0006, 2203/0172, 2203/051
See application file for complete search history.

(56) References Cited

U.S. PATENT DOCUMENTS

| 5,415,043 A | * | 5/1995 | Zabler et al. | ............... 73/514.38 |
| 7,847,421 B2 | * | 12/2010 | Gardner et al. | ............... 290/1 R |

(Continued)

FOREIGN PATENT DOCUMENTS

| FR | 2871253 | 12/2005 |
| WO | WO 2006/046937 | 5/2006 |
| WO | WO 2008/005113 | 1/2008 |

OTHER PUBLICATIONS

Kulah et al. "Energy Scavenging From Low-Frequency Vibrations by Using Frequency Up-Conversion for Wireless Sensor Applications" IEEE Sensors Journal, IEEE Service Center, 8:3:261-268, Mar. 1, 2008.

(Continued)

*Primary Examiner* — Vanessa Girardi
(74) *Attorney, Agent, or Firm* — Occhiuti Rohlicek & Tsao LLP

(57) ABSTRACT

An apparatus for amplifying a vibratory movement includes a micromechanical device having an interface for fixedly joining it to a vibrating member; a mass mounted to be mobile in at least one degree of freedom relative to the interface; a spring capable of exerting a return force between the mobile mass and the interface; an orientation-detecting member for detecting the orientation of the shift of the interface according to said degree of freedom; and a coupling member for coupling the mobile mass to the interface. The coupling member is configured to couple the mobile mass to the interface when an orientation of shift of the interface is opposite that of the mobile mass and to uncouple the mobile mass from the interface before a change in orientation of the interface and when the orientation of shift of the interface is identical to that of the mobile mass.

16 Claims, 5 Drawing Sheets

U.S. PATENT DOCUMENTS

| | | | |
|---|---|---|---|
| 2009/0085442 A1 | 4/2009 | Kozinsky et al. | |
| 2010/0264777 A1* | 10/2010 | Medhat et al. | 310/300 |
| 2011/0193350 A1* | 8/2011 | Rastegar et al. | 290/1 C |
| 2012/0216616 A1* | 8/2012 | Schultz | 73/514.38 |

OTHER PUBLICATIONS

Lee et al. "Novel Micro Vibration Energy Harvesting Device Using Frequency Up Conversion" Solid-State Sensors, Actuators and Microsystems Conference, 871-874, Jun. 10, 2007.

Burrow et al. "Vibration Energy Harvesters with Non-Linear Compliance" SPIE, PO Box 10, Bellingham WA 98227, 6929:692807-1-692807-10, Apr. 4, 2008.

Loverich et al. "Stiffness Nonlinearity as a Means for Resonance Frequency Tuning and Enhancing Mechanical Robustness of Vibration Power Harvesters" SPIE, PO Box 10, Bellingham WA 98227, 6928, Apr. 4, 2008.

Burrow et al. "Vibration energy harvesters with non-linear compliance" *Proc. of SPIE*, 6928: pp. 692807-1 to 692807-10 (2008).

Loverich et al. "Stiffness nonlinearity as a means for resonance frequency tuning and enhancing mechanical robustness of vibration power harvesters" *Proc. of SPIE*, 6928: pp. 692805-1 to 692805-10 (2008).

Lee et al. "Novel Micro Vibration Energy Harvesting Device Using Frequency Up Conversion" *Transducers & Eurosensors: The 14th International Conference on Solid-State Sensors, Actuators and Microsystems*, pp. 871-874 (2007).

Kulah et al. "Energy Scavenging From Low-Frequency Vibrations by Using Frequency Up-Conversion for Wireless Sensor Applications" *IEEE Sensors Journal*, 8(3):261-268 (2008).

* cited by examiner

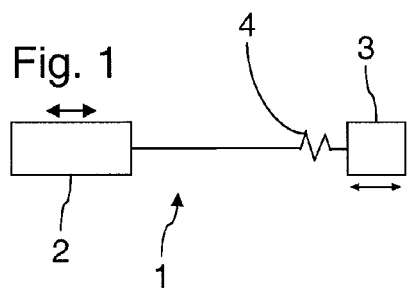
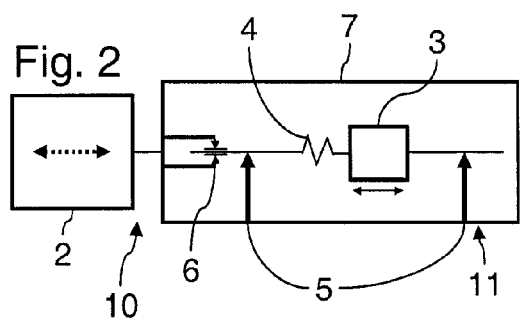
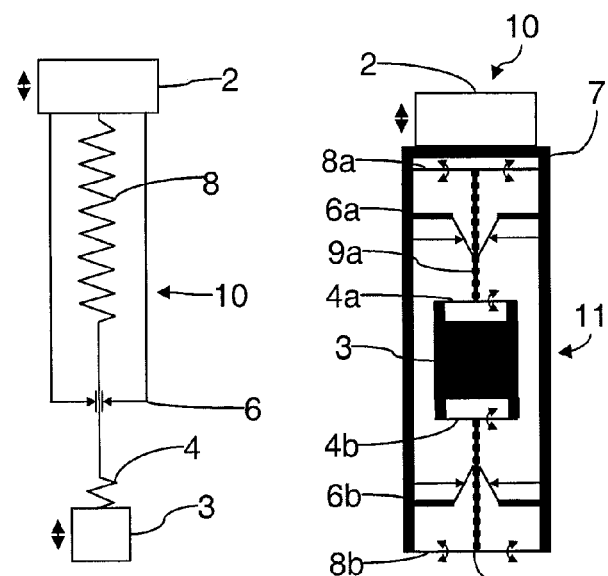
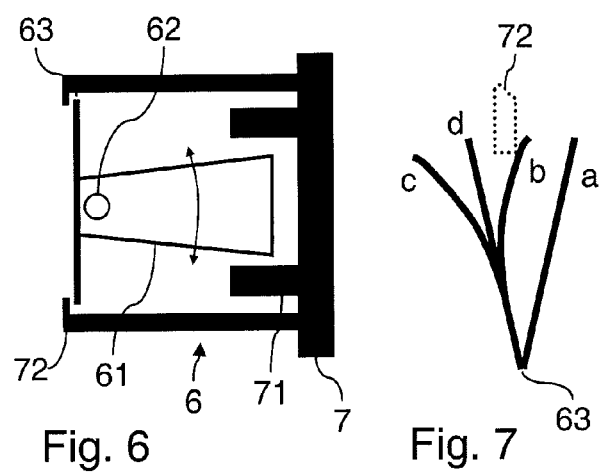
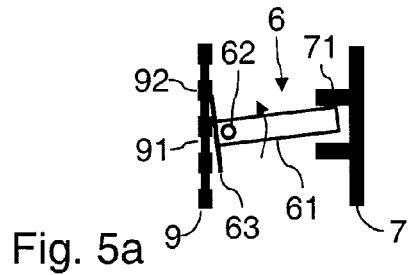
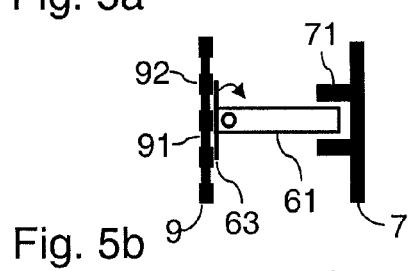
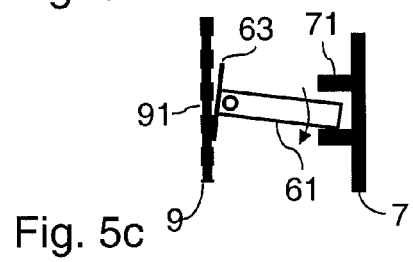
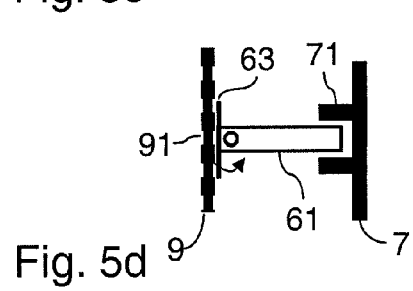

MICROMECHANICAL DEVICE FOR AMPLIFYING A VIBRATING MOVEMENT

CROSS REFERENCE TO RELATED APPLICATIONS

This application is the national stage entry under 35 USC 371 for PCT/EP2010/058185, filed Jun. 10, 2010, which claims the benefit of the Jun. 23, 2009 priority date of French application Ser. No. 09/03020. The contents of both the foregoing applications are incorporated herein by reference.

The invention pertains to the amplification of a vibratory motion, especially with a view to converting vibrational energy into electrical energy.

In certain environments, for example in hostile surroundings or in mechanisms in motion, it may be difficult to connect an electrical circuit to power supply cables. To mitigate this problem, there are known micromechanical devices for converting vibrational energy into electrical energy. These devices form microsystems generally attached to vibrating supports such as machines or vehicles. According to one known technique, a resonant system is used to amplify a mechanical vibration of a support and convert the amplified motion into electricity.

A resonant system generally consists of a mobile mass m attached to a support by a spring with a stiffness k. The system then resonates at the resonance frequency $f_r$ given by:

$$f_r = \sqrt{k/m}$$

When the support undergoes a vibration at this frequency, the mobile mass also starts oscillating at this frequency with an amplitude that increases until the mechanical damping dissipates the exact equivalent of the mechanical energy provided at each cycle: the dissipated energy indeed increases faster than the energy added during the increase in amplitude, and finally becomes equal to it. If the mechanical damping is relatively weak (with a high mechanical quality factor) the mechanical amplification may be in the range of several hundreds (amplitude of shift of the mobile part relatively to the amplitude of the shift of the support). The greater the mechanical amplification, the greater the energy transmitted by the vibrating support to the mobile support. Through the preponderant use of electrical damping, an excitation of the mass at the resonance frequency maximizes the electrical energy extracted relatively to the input vibration.

To better identify the increase in the energy absorbed at each cycle as and when the cycles occur, let us take the case of a resonant system 1 as shown in FIG. 1, in the absence of damping, and in assuming that the motion of the support is almost insensitive to the presence of the mass and of the spring, with:

ΔV being the gain and speed of the mobile mass 3, in terms of absolute value, of the mobile part at each half period;
m being the mass of the mobile mass 3;
f being the vibration frequency dictated on the support 2;
fr in Hz the resonance frequency of the mass structure 3+spring 4, equal to f;
$Vm_0$ the initial speed of the mass 3;
The kinetic energy of the mass is therefore initially:

$$\frac{1}{2}mV_{m0}^2$$

After a half period, the kinetic energy of the mass is then:

$$\frac{1}{2}m(V_{m0} + \Delta V)^2$$

After a full period, the kinetic energy of the mass is:

$$\frac{1}{2}m(V_{m0} + 2\Delta V)^2$$

The gain in kinetic energy of the mass is then:

$$\Delta E = \frac{1}{2}m(\Delta V^2 + 2V_{m0}\Delta V)$$

However, as soon as the frequency of the vibration moves away from the resonance frequency, the relative shifts of the mass and of the support are for most of the time phase-shifted. The mechanical quality factor drops, thus inducing a drop in the quantity of electrical energy that can be generated.

To overcome this problem, there are known ways of using a series of resonant systems having distinct resonance frequencies. It is thus possible to generate a quantity of energy sufficient for a greatly extended range of vibration frequencies. However, only one resonant structure can be excited simultaneously, making such a structure relatively bulky for the quantity of energy that it can be used to generate.

There is also a known way, described in the document FR20055181, for using a resonant system provided with a spring, the behavior of which is non-linear. This system has a resonance frequency that increases with the amplitude of the shift between the mass and the support. The resonance frequency of the system however shifts and is always shifted relatively to the excitation frequency of the vibration. Consequently, the amplification related to the resonance is always relatively limited.

The invention seeks to resolve one or more of these drawbacks. The invention thus relates to a micromechanical device for amplifying a vibratory movement, comprising:
an interface for fixedly joining the device to a vibrating member;
a mass mounted so as to be mobile in at least one degree of freedom relatively to the interface;
a spring capable of exerting a return force between the mobile mass and the interface;
a member for detecting the orientation of the shift of the interface according to said degree of freedom;
a member for coupling the mobile mass to the interface, configured to couple the mobile mass to the interface when the orientation of shift of the interface is opposite that of the mobile mass and configured to uncouple the mobile mass from the interface before a change in orientation of the interface and when the orientation of shift of the interface is identical to that of the mobile mass.

According to one variant, the device comprises a member for detecting a maximum speed of the interface and the coupling member is configured to couple the mobile mass to the interface when the interface reaches its maximum speed.

According to yet another variant, the member for detecting the orientation of shift and/or the member for detecting the maximum speed comprise an accelerometer, the coupling member comprises an electrically controlled actuator, the device furthermore comprising a processing device controlling the actuator according to measurements given by the accelerometer.

According to another variant, the maximum speed is detected as a function of the increase and the decrease of the acceleration when it passes through a zero value.

According to yet another variant, the mass is mobile in translation relatively to the interface, the coupling member comprises a counterweight mounted so as to be pivoting relatively to an axis perpendicular to the axis of translation of the mass with an imbalance, the counterweight being mounted so as to be pivoting between two positions in which the mass is coupled to the interface for respective orientations of shift of the mass relatively to the interface.

According to one variant, the interface and the mobile mass have grooved conductive surfaces facing each other to form a capacitor, the device comprising a control circuit selectively applying a voltage between the grooved surfaces to couple or uncouple the interface and the mobile mass.

According to yet another variant, the control circuit is configured to discharge and store selectively the charge included in the formed capacitor.

According to yet another variant, the mass is mobile in translation relatively to the interface, the coupling member comprising a piezoelectric element controlled so as to stretch in a direction perpendicular to the direction of shift of the mass so as to couple the mass to the interface.

According to yet another variant, the piezoelectric element extends along a direction perpendicular to the direction of shift of the mass and is flexible so as to form said spring during the coupling.

According to one variant, the interface, the mass and the spring comprise a common element formed as a single-piece unit in a silicon substrate.

According to yet another variant, the mass comprises an added-on element fixed to the single-piece element.

According to another variant, the spring is formed by a flexible strut made in the single-piece element.

According to yet another variant, the mass has a coupling part provided with an alternation of notches and bulges, the coupling member comprises an actuator that gets inserted into a notch of the coupling part during a coupling.

According to one variant, the device comprises a member for converting the mechanical energy of the mobile mass into electrical energy.

The invention also pertains to a system comprising a micromechanical amplification device as described here above and a vibrating support fixedly joined to the interface of the micromechanical device, the vibrating member having a mass at least fifty times greater than that of the micromechanical device.

The invention furthermore pertains to a method for amplifying a vibrational movement by means of a mechanical device, comprising the steps of:
  providing a micromechanical device mounted with a mass mobile in at least one degree of freedom relatively to the vibrating member and provided with a spring capable of exerting a return force between the mobile mass and the vibrating member;
  detecting the orientation of the shift of the interface according to said degree of freedom;
  coupling the mobile mass to the vibrating member when the orientation of shift of the interface is opposite that of the mobile mass and uncoupling the mobile mass from the interface before a change in orientation of the vibrating member and when the orientation of shift of the interface is identical to that of the mobile mass.

Other features and advantages of the invention shall emerge clearly from the following description, given by way of a non-exhaustive indication, with reference to the appended drawings, of which:

FIG. 1 is a schematic representation of a resonant system;

FIG. 2 is a schematic representation of a device for amplifying vibrations according to one example of implementation;

FIG. 3 is a schematic representation of a device for amplifying vibrations according to a first variant;

FIG. 4 is a schematic representation of a device for amplifying according to a second variant;

FIGS. 5a to 5d represent different positions of an inertial coupling device during its operation;

FIG. 6 is a schematic representation of a variant of an inertial coupling device;

FIG. 7 represents different positions of a tab of the mechanism of FIG. 6;

Figure 10:
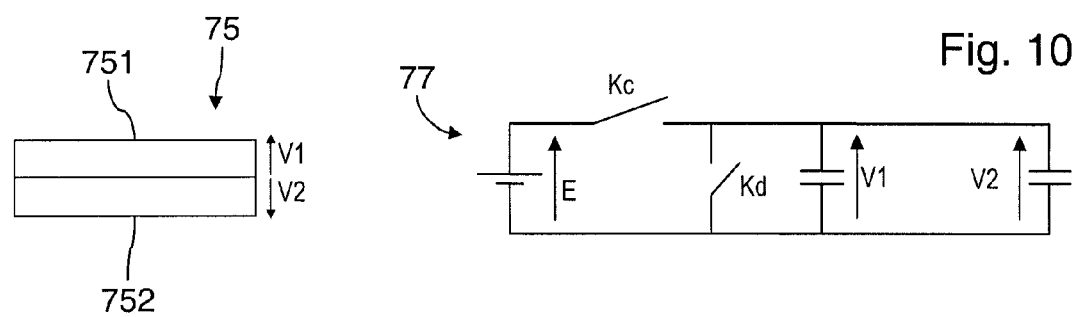
Figure 11:
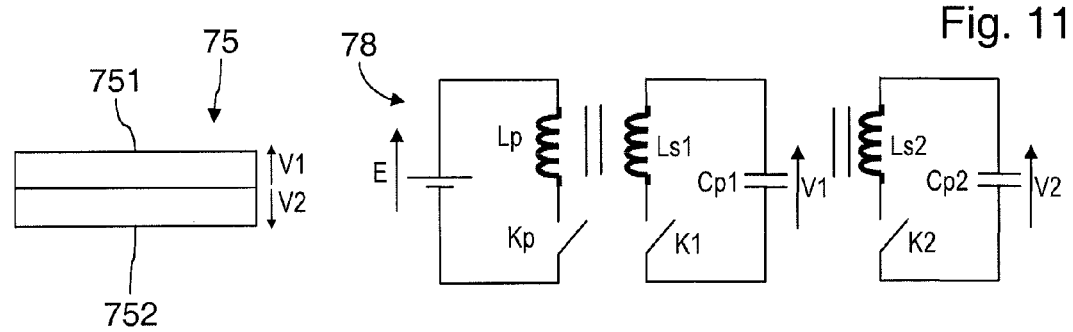
Figure 13:
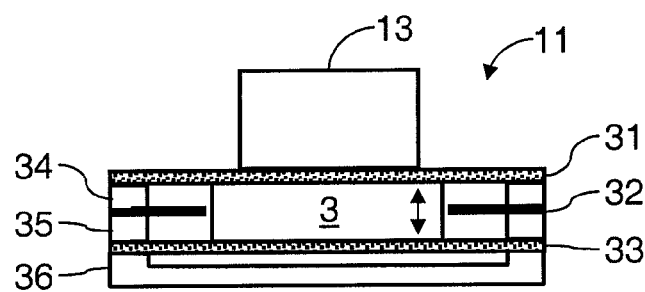
Figure 14:
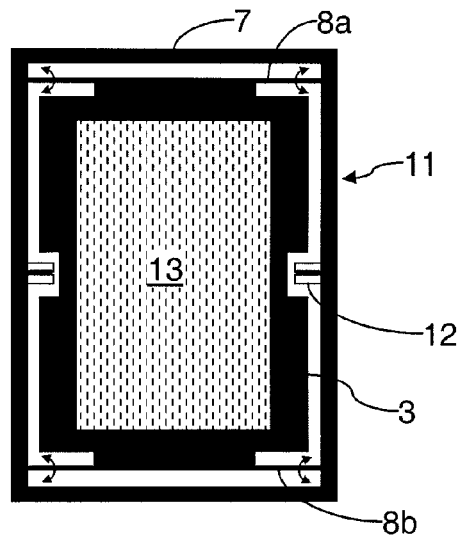
Figure 15:
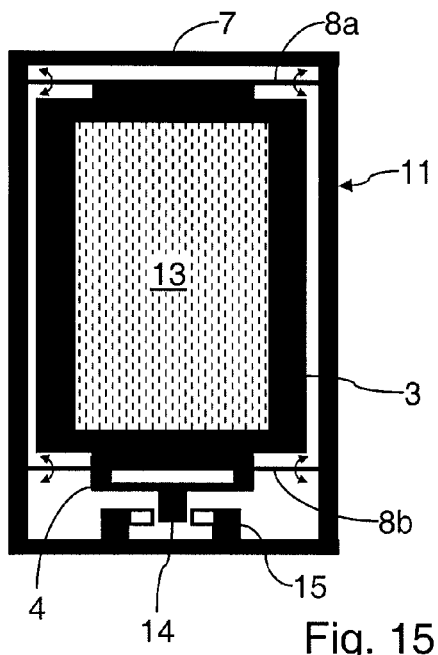

FIGS. 9a to 9e schematically represent a device for amplifying vibrations according to a fourth variant at different steps of its operation;

FIGS. 10 and 11 represent alternatives to piezoelectric two-strip control circuits;

FIGS. 12a to 12e schematically represent a device for amplifying vibrations according to a fifth variant at different steps of its operation;

FIG. 13 is a view in section of a device for amplifying vibrations according to a sixth variant;

FIG. 14 is a top view of a device for amplifying vibrations according to a seventh variant;

FIG. 15 is a top view of a device for amplifying vibrations according to an eighth variant;

FIGS. 16 to 20 schematically represent different coupling mechanisms.

The invention proposes to make a pseudo-resonant micromechanical device for the amplification of a vibratory motion. The device comprises a mass that is mobile relatively to a vibrating member. A spring exerts a return force between the mobile mass and the vibrating member. The orientation of shift of the vibrating member is determined. The vibrating member and the mobile mass are coupled when the vibrating member shifts along an orientation inverse to that of the mobile mass. The vibrating member and the mobile mass are uncoupled before any change in orientation of the vibrating member when this vibrating member moves in the same direction as the mobile mass.

Thus, the vibrating member can increase the kinetic energy of the mobile mass even when the vibration frequency is distant from the resonance frequency of the mass and of the spring. The device thus brings greater kinetic energy to the mobile mass on very great range of vibration frequencies while at the same time preserving the compactness of a micromechanical device. The invention proves to be particularly advantageous when the vibrating member has a highly variable vibratory frequency.

FIG. 2 schematically represents a resonant system 10 designed to implement the invention. The resonant system 10 comprises a vibrating support 2 and a micromechanical device for amplifying vibratory motion 11. The vibrating support 2 either has a mass far greater than that of the amplification device 11 or is fixedly joined to a source of vibrations on which the absorption of energy by the amplification device 11 is negligible. The support 2 has at least one vibrating component along the direction indicated by the dotted arrow. An accelerometer not shown measures the acceleration of the support 2. From these measurements of acceleration, the orientation of instantaneous shift of the support 2 along its direction of vibration is determined. The sign of the derivative of the acceleration makes it possible especially to determine the orientation of the shift of the support 2. The changing of the sign of the acceleration for its part makes it possible to determine the instant of passage by a maximum or minimum speed. After a change of sign, the new sign of the acceleration makes it possible to determine whether it is a minimum or a maximum speed (with z designating the position of the support 2, z"=0=>the extreme value of z', z" passes from 0⁻ to 0⁺=>the minimum value of z', z" passes from 0⁺ to 0⁻=>maximum value of z').

The amplification device 11 has a pack 7 forming an interface for fixed joining with a vibrating support 2. The pack 7 is fixed by any appropriate means to the support 2. The pack 7 includes a mobile mass 3 fixedly joined to a first end of a return spring 4. Rods not referenced are fixedly joined respectively to the second end of the return spring 4 and the mobile mass 3. These rods are guided in translation by seatings 5 in a direction illustrated by the arrow in unbroken lines, collinear with the direction of vibration of the support 2. A coupling member 6 enables the selective coupling of the assembly formed by the mass 3 and the spring 4 to the pack 7.

By its principle, the coupling member 6 is activated to couple the assembly formed by the mass 3 and the spring 4 to the pack 7 when the orientation of the speed of the support 2 is opposite the speed of the mass 3. The mass 3 is thus forced to change its orientation. The kinetic of the energy of the mass 3 is thus increased during the coupling. When the mass 3 and the support 2 then shift along the same orientation, the coupling member 6 is controlled so as to uncouple the set formed by the mass 3 and the spring 4 from the pack 7. The uncoupling must take place especially before a change in orientation of the shift of the support or of the mass 3. Thus, the support 2 is prevented from hampering the motion of the mass 3 by absorbing its kinetic energy. The coupling duration is therefore smaller than a half period of vibration of the support 2 and is very advantageously related to a final period of resonance of the assembly formed by the mass 3 and the spring 4. In practice, a resonance frequency is chosen such that the half period of resonance is smaller than the greatest half period of vibration of the support 2. This amounts to choosing a resonance frequency for the assembly formed by the mass 3 and the spring 4 that is greater than the maximum frequency of the support 2. Advantageously, the coupling will take place when the support 2 reaches its maximum speed (in absolute value) in order to transfer a maximum of kinetic energy to the mobile mass 3. The uncoupling is done at a time that is later by one half period of resonance of the assembly formed by the mass 3 and the spring 4, this half period being advantageously short relatively to the half period of vibration of the support 2. The speed reaches an extreme value (maximum speed or minimum speed) when a zero acceleration is detected on the support 2.

It is possible to deduce the orientation of the shift of the mass 3 for the coupling as follows: since the resonance frequency can be determined from the mobile mass 3 and the stiffness of the spring 4, it is easy to determine the instant at which the orientation of the shift of the mass 3 will change. In fact, the sense of the shift of the mass 3 changes after each coupling. If the initial sense is known and if the number of couplings is counted (by changing for example the state of an even parity/odd parity register at each coupling), it is possible therefrom to deduce the sense of shift in progress. It is also possible to provide the mass 3 with an accelerometer (not shown) to determine the orientation of its shift.

The coupling member 6 can carry out this coupling by tightening the rod fixedly joined to the spring 4. The coupling can also be done by any appropriate means, for example by means of an electromagnetic actuator, an electrostatic actuator, a thermal actuator or a piezoelectric actuator. The coupling member 6 can be commanded by an electronic control device not shown connected to the accelerometer of the pack 7.

FIG. 3 provides a schematic view of a variant of a pseudo-resonant system 10 according to the invention. In this example, the assembly formed by the mass 3 and the spring 4 is guided in translation relatively to the support 2 by means of a secondary spring 8. A rod connects the spring 4 to one end of the secondary spring 8. The other end of the secondary spring 8 is fixed to the support 2. The spring 8 provides for guidance in translation of the mass 3 when its axis is vertical. Another function of the secondary spring 8 is to reposition the mass 3 on an average at the middle of the travel of its shift and to limit the amplitude of this travel. The coupling member 6 selectively couples or uncouples the support 2 with respect to the rod joining the springs 4 and 8.

The secondary spring 8 has a stiffness k2 that is far smaller than the stiffness k1 of the spring 4. The system including the mass 3 and the spring 4 then has a first resonance frequency fr1 during the coupling and a second resonance frequency fr2 during the uncoupling. The first and second resonance frequencies meet the following relationships:

$$f_r = f_{r1} = \sqrt{\frac{k_1}{m}}$$

$$f_r = f_{r2} = \sqrt{\frac{\frac{k1 k2}{k1 + k2}}{m}} \cong \sqrt{\frac{k_2}{m}}$$

Consequently, the mass 3 will not change its orientation during the uncoupling if the vibration frequency of the support 2 is greater than the resonance frequency fr2. Furthermore, the presence of the secondary spring 8 practically does not modify the first resonance frequency and the duration during which the mass 3 can be coupled to the support 2.

FIG. 4 shows a top view of another variant of a resonant system 10, especially suited to being made in a silicon structure. The device for amplifying the vibratory movements 11 comprises a frame 7 fixedly joined to the support 2. A mass 3 is mounted so as to be mobile in the frame 7 in a direction corresponding to a component of the vibrations of the support 2. Return springs 4a and 4b are made in the form of struts at opposite ends of the mass 3. The springs 4a and 4b are fixed so as to be embedded in the mass 3 at their ends. Rods 9a and 9b are fixedly joined by an end respectively to the springs 4a and 4b. The rods 9a and 9b are fixed so as to be embedded in the median part of the springs 4a and 4b. A relative motion between the mass 3 and a rod 9a or 9b induces a deflection of the struts forming the springs 4a and 4b. The amplification device also comprises secondary springs 8a and 8b embedded in their median part with another end respectively of the rods 9a and 9b. The secondary springs 8a and 8b are embedded by their ends in the frame 7. The secondary springs 8a and 8b have a stiffness far smaller than that of the return springs 4a and 4b. The secondary springs 8a and 8b are duplicated and placed on either side of the mass 3 in order to guide it in translation relatively to the frame 7.

Two coupling members 6a and 6b are positioned on either side of the mass 3. The coupling members 6a and 6b have tabs actuated so as to get inserted into notches made in the rods 9a and 9b. When the tabs get inserted into the notches, the rods 9a and 9b are immobilized relatively to the frame 7. The tabs are fixedly joined to the support made in the frame 7. The shifting of the tabs is advantageously made by means of electrically-controlled actuators.

According to one variant, the springs in the form of struts 4a and 4b can be eliminated and the rods 9a and 9b are then embedded directly in the mass 3. Struts supporting the tabs of the coupling members 6a and 6b can be thinned in order to be deformable and form return springs when the tabs get coupled with the rods 9a and 9b.

The structure of the amplification device 11 of FIG. 4, can be made by etching a silicon wafer. Indeed, the different mechanical elements of the device 11 can be made as a single piece by etching in the thickness of a silicon wafer. The stiffness of each of the springs could especially be defined by making struts of varying width.

The amplification device could be made by etching of a silicon substrate in which the accelerometer is made. It is thus possible to reduce the space occupied by the device and improve its quality factor. The greater this quality factor, the more limited will be the mobile mass needed to generate a given quantity of energy.

The coupling member 6 can function inertially, without requiring an electronic control circuit. FIGS. 5a to 5d illustrate a coupling member 6 in different positions relatively to a rod 9 fixedly joined to the mass. The coupling member 6 comprises a counterweight 61, a rotationally guiding rod 62 and a locking tab 63. The tab 63 is fixed to the counterweight 61. The rod 62 guides the coupling member 6 in rotation about an axis perpendicular to the direction of shift of the mass 3. The rod 62 is placed in the vicinity of the junction between the counterweight 61 and the tab 63 so that a major imbalance is generated about the rod 62.

The frame 7 has a housing 71 in which the distal end of the counterweight 61 is placed with a certain clearance. Besides, the rod 9 has a series of notches 91 enabling the coupling between the rod 9 and the coupling member 6 when a tab 63 gets inserted in a notch 91 and the release of the tab 63 by certain motions of the rod 9.

In FIG. 5a, it is assumed that the support and the frame 7 get shifted upwards, while the rod 9 and the mass get shifted downwards. After the speed of shift of the frame 7 has reached a maximum level, the frame 7 starts deceleration. Owing to its kinetic energy, the coupling member 6 tends to preserve a speed greater than that of the frame 7 during the deceleration. Owing to the imbalance, the counterweight 61 swivels about the rod 62 as illustrated by the arrow. During this swiveling, one end of the tab 63 gets inserted in a notch 91. The opposite orientation of the movements tends to push the tab 63 into the notch 91. Thereupon, the rod 9 is coupled to the frame 7 and gets shifted in the same orientation as the frame, i.e. upwards. The lateral walls of the housing 71 limit the course in rotation of the counterweight 61.

In FIG. 5b, the rod 9 continues its upward course. The frame 7 attains zero speed and then changes its orientation of shift and initiates a downward travel. The bulges 92 delimiting the notches 91 rest on the tab 63 during the upward shift of the rod 9. Thus, the tab 63 comes out of its notch 91 which decouples the rod 9 from the frame 7.

In FIG. 5c, the frame 7 shifts initially downwards while the rod 9 shifts initially upwards. The speed of shift of the frame 7 reaches a maximum and the frame 7 starts deceleration. Owing to its kinetic energy, the coupling member 6 tends to maintain a speed higher than that of the frame 7 during the deceleration. Owing to the imbalance, the counterweight 61 swivels about the rod 62 as illustrated by the arrow. During this swiveling, one end of the tab 63 gets inserted into a notch 91. This means that the rod 9 is coupled to the frame 7 and gets shifted along the same orientation as the frame, i.e. downwards.

In FIG. 5d, the rod 9 continues its downward travel. The frame 7 reaches zero speed and then changes its orientation of shift and initiates an upward travel. The bulges 92 delimiting the notches 91 rest on the tab 63 during the downward shift of the rod 9. Thus, the tab 63 comes out of its notch 91, thus uncoupling the rod 9 from the frame 7.

This mechanism advantageously enables the coupling of the rod 9 to the frame 7 when its speed is at a maximum. Moreover, this mechanism enables the rod 9 to be uncoupled from the frame 7 during a reversal of direction. This mechanism also makes it possible to eliminate the complexity of an electronic coupling command.

To optimize the working of this coupling mechanism 6, it is desirable that the pitch between the notches 91 should be very small as compared with the mean amplitude of the vibration of the support (for example smaller than 10% of this amplitude). Furthermore, the rotational travel of the counterweight 61 is advantageously very small as compared with the amplitude of the vibration of the support, so that it serves essentially to detect the orientation of the shift of the support and its deceleration. The tab 63 is advantageously made to limit mechanical damping during the coupling. Furthermore, the tab 63 is advantageously made so as to limit friction on the rod 9 in order to improve the quality factor of the amplification device 11.

FIG. 6 illustrates an alternative embodiment of the inertial coupling device. In this variant, the frame 7 has protrusions 72 placed at the ends of a flexible tab 63. These protrusions 72 are designed to interfere with the tab 63 during the rotational movements of the counterweight 61. FIG. 7 illustrates different positions of the tab 63 relatively to a protrusion 72 during a rotation of the counterweight 61. In the position illustrated by a, the counterweight 61 initiates a rotation which makes the end of the tab 63 approach the protrusion 72. In the position illustrated by b, the counterweight 61 brings the tab 63 into contact with the protrusion 72. While the counterweight 61 continues its rotational motion, the tab 63 is held by the protrusion 72 and gets deflected in storing elastic energy. In the position illustrated by c, when the counterweight 61 has rotated to a sufficient extent, the tab 63 crosses the obstacle formed by the protrusion 72. The motion of the tab 63 towards a rod provided with notches is greatly accelerated because of the preliminarily stored elastic energy. Thus, a rapid penetration of the end of the tab 63 into a notch 91 is ensured. Furthermore, the protrusion 72 makes it possible to keep the tab 63 away from the bulges in the decoupling position in order to prevent friction. The locking position c is reached only through the elastic energy of deflection preliminarily stored in the tab 63 before the protrusion 72 is crossed. When the rod 9 ultimately goes back in the sense of the pack 7, the tab 63 comes out of the notch 91 with lower kinetic/potential energy bringing it into a position of equilibrium d at a distance from the rod, thus limiting any risks of friction.

Although not illustrated in FIGS. 2 to 7, the devices for amplifying vibrations can also have a member for converting the mechanical energy of the mobile mass into electrical energy. It is possible to this end to use electrostatic, electromagnetic or piezoelectric conversion by exploiting the relative movement between the mobile mass and the support (as described in detail in the patent application FR2896635 A1). Examples of converters shall be described in detail here below.

Figure 8:
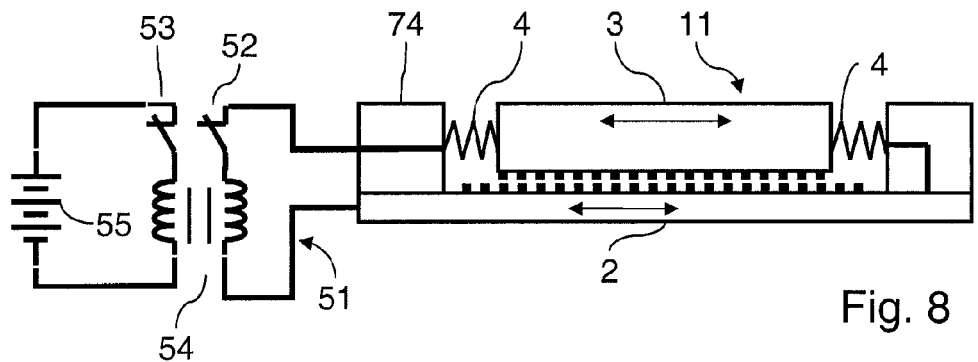
FIG. 8 is a side view of a device for amplifying vibrations according to a third variant.

FIG. 8 illustrates another embodiment of an amplification device 11. The support 2 has a vibration component in a horizontal direction. Pads 74 are fixed to the support 2 on either side of a mobile mass 3. The mobile mass 3 is mobile in translation relatively to the support 2. The mobile mass 3 is connected to the pads 74 respectively through springs 4. The support 2, the springs 4 and the mobile mass 3 are conductive or have connections to form an electrical circuit. The electrical circuit formed comprises the following in series: the spring 4, the conductive part of the mobile mass 3, another spring 4 and the conductive part of the support 2. A control device 51 is connected to the terminals of this electrical circuit. The control circuit 51 has switches 52 and 53, a transformer 54 and a battery 55.

The mobile mass 3 and the support 2 have grooved conductive surfaces positioned so as to be facing each other. The surfaces have an alternation of notches and bulges in the direction of shift of the mobile mass 3. These grooved surfaces have a same pitch. A capacitor is formed between the mobile mass 3 and the support 2, its capacitance being variable as a function of the relative position between the mass and the support.

When it is desired to couple the mobile mass 3 to the support 2, the grooved surfaces are charged with an electrical charge given by the battery 55 in transitorily and successively closing the switches 53, then 52. The switches 52 and 53 are closed when a maximum speed of the support 2 is detected and when the notches of the grooved surfaces are facing each other. The switches 52 and 53 are again transitorily closed but in a reverse order (52 and then 53) when the voltage at the terminals of the capacitor formed reaches a minimum or goes back below a first limit or again passes beyond a second limit, in order to remove the electrical charge from the capacitor. In the case of a minimum voltage discharge Vmin, the capacitance at the instant of this discharge has a maximum value Cmax. This case corresponds to an effective coupling, the mobile mass 3 is effectively distributed in the other sense in passing through the maximum capacitance (the electrostatic force induced by the introduction of the electrical charge into the capacitor has been sufficient to block and change the sense of the mobile mass 3). It is possible also to achieve an incomplete coupling by removing the electrical charge slightly before the electrical capacitance goes back through its maximum value, i.e. in activating the withdrawal of the charge as soon as the voltage goes back beneath a threshold instead of waiting for it to go through a minimum. This operation enables extraction of a small quantity of electrical energy at each coupling (removal of the electrical charge at a capacitance value below that of the injection or the energy $E=\frac{1}{2}Q^2/C$ associated with this charge increases with the decrease in capacitance).

Before obtaining a coupling between the mobile mass 3 and the support 2, the mobile mass 3 continues its course with an orientation which is the inverse of that of the support 2 under the effect of its kinetic energy. When a notch of the mobile mass 3 travels through half of a pitch of the grooved surfaces, it means that the charge stored in the capacitor is not sufficient to achieve coupling. In this intermediate position, the capacitance has a minimum value Cmin while the voltage at the terminals of the electrical circuit has a maximum value Vmax. Then, the switch 52 is closed transitorily to discharge the energy stored in the capacitor towards the magnetic circuit of the transformer 54 via a primary coil. The switch 53 is then transitorily closed in order to transfer the energy stored in the magnetic circuit to the battery by means of a secondary coil of the transformer 54. Since the introduction of the electrical charge into the capacitor is done at maximum capacitance, i.e. with an energy equal to $\frac{1}{2}Q^2/Cmax$, and since the withdrawal of this energy is done at minimum capacitance, i.e. in restoring energy equal to $\frac{1}{2}Q^2/Cmin$, an excess of energy of $\frac{1}{2}Q^2$ (1/Cmin−1/Cmax) has been produced.

The mobile mass 3 then loses a little of its kinetic energy. Consequently, when the notches of the grooved surfaces are again facing each other, the switches 53 and then 52 are closed transitorily in order to achieve the coupling of the mass 3 and of the support 2.

When the mobile mass 3 and the support 2 are coupled and therefore shift according to the same orientation, the switch 52 is again transitorily closed to empty the charge contained in the capacitor, and then the switch 52 is kept open in order to maintain the mobile mass 3 uncoupled from the support 2. The switch 53 is then transitorily closed to transfer the charge coming from the capacitor, which was transiently stored in the magnetic circuit of the transformer 54 during the closing of switch 52, to the battery 55.

The control circuit 51 thus enables both the coupling/decoupling and the retrieval of energy generated by the movement of the mobile mass 3.

By using grooved surfaces whose pitch is sufficiently small, it is possible to achieve coupling between the mobile mass 3 and the support 2 on the entire travel of the mobile mass 3.

Figure 9A:
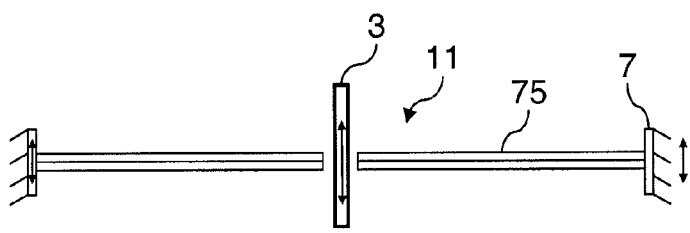

FIG. 9a is a schematic view of another embodiment of an amplification device 11. A mobile mass 3 is mounted so as to be sliding relatively to a frame 7 in a direction of shift. Piezoelectric dual strips 75 positioned so as to be facing each other are embedded by one end in the frame 7 and extend appreciably in a direction perpendicular to the shift of the mass 3. The dual strips 75 are controlled so that by applying an appropriate electrical voltage to them, they stretch in the direction of the mass 3 until they grip it by their free end and ensure the coupling between the frame 7 and the mass 3. Owing to their elongated configuration and their position which is perpendicular to the motion of the mass 3, the dual strips 75 undergo a deflection during a coupling if a relative motion exists between the frame 7 and the mobile mass 3.

Figure 9B:
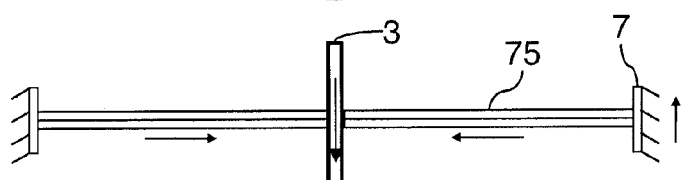
Figure 9C:
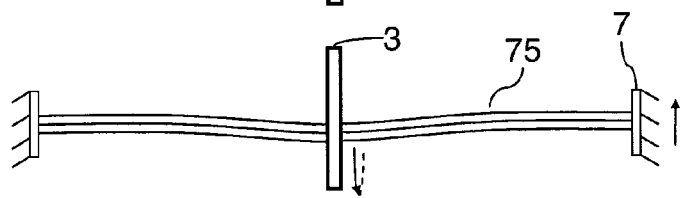
Figure 9D:
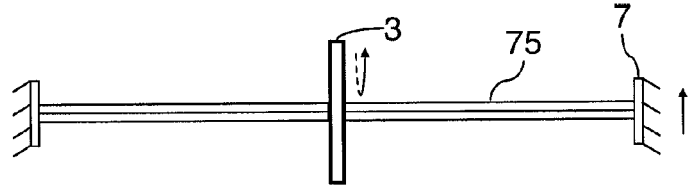
Figure 9E:
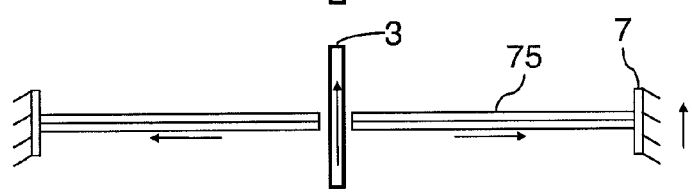

FIGS. 9b to 9e illustrate the working of the device 11 during different phases. In FIG. 9b, the mobile mass shifts downwards while the frame 7 shifts upwards. During these opposite shifts, an elongation of the dual strips 79 is activated. The dual strips 75 then achieve coupling between the frame 7 and the mobile mass 3. The downward movement of the mass 3 continues transitorily in inducing a bending of the dual strips 75. The mass 3 finally has a zero relative speed in relation to the frame 7 when the deflection of the dual strips 75 is the maximum (FIG. 9c). In FIG. 9d, the mass 3 shifts along the same orientation as the frame 7, under the effect of the driving by the frame 11 and the recall by the spring effect of the dual strips 75. In FIG. 9e, the dual strips 75 are activated to decouple the mass 3.

The use of the piezoelectric dual strips 75 proves to be advantageous since it enables major coupling forces to be exerted on the mass 3. Furthermore, the piezoelectric dual strips make it possible, with appropriate sizing, to form a spring giving a high quality factor because of the low structural damping of the piezoelectric material. Furthermore, by using an appropriate control system, the energy stored in the dual strips 75 by increasing their differential voltage during their deflection (conversion of mechanical deformation into electrical voltage in the piezoelectric material) can be retrieved in order to convert the kinetic energy of the mass 3 into electrical energy. The piezoelectric materials are capable of generating electrical charges as a result of their traction or compression. Their mechanical/electrical conversion efficiency is all the higher as the deformation applied to them is rapid.

FIG. 10 is a schematic representation of a piezoelectric dual strip and a first embodiment of a circuit designed to command it. The circuit 77 comprises a voltage source E, switches Kc and Kd, and terminals for applying potentials V1 and V2 on the strips 751 and 752 respectively. The elongation of the dual strip 75 is obtained by closing the switch Kc and by opening the switch Kd. The retraction of the dual strip is obtained by opening the switch Kc and closing the switch Kd.

FIG. 11 is a schematic view of a piezoelectric dual strip 75 according to a second embodiment of the circuit designed to control it. The circuit 78 furthermore enables the electrical energy stored in the dual strip 75 to be transferred to a voltage source E.

The transitory closures of Kp, and then of K1 and K2 enable the transfer of energy from the source E to the strips 751 and 752. The transitory closures of K1 and K2 and then of Kp enable the transfer of energy from the strips to the source E.

To ensure coupling, energy is transferred from the source E to the strips. The deflection of the dual strips 75 illustrated in FIG. 9c which follows the coupling gives rise to an elongation of the strip 751 and a contraction of the second strip 752, thus tending to cause the potential V1 to increase and the potential V2 to decrease. When the deflection is the maximum, one part of the electrical charge stored in the piezoelectric strip 751 (the voltage of which has increased during its elongation) is transferred to the source E by transitory closures of K1 and then of Kp. At the same time, an electrical charge is transferred from the source E to the second strip 752, the voltage of which drops during its contraction. Since the electrical charge collected at the strip 751 is at a higher potential than the electrical charge transferred to the strip 752, if the charges collected and transferred are the same, then the source E collects more energy than it provides and therefore its energy is increased (Gain=½QΔV). In fact, owing to the opposite deformations of the two strips 751 and 752, a differential voltage is created between these strips and by bringing this potential difference to zero, what will be called the differential voltage energy is retrieved.

Finally, when the dual strip 75 returns to the non-flexed position (FIGS. 9d to 9e) the energy present at each of these two strips 751 and 752 is transferred to the source E through transitory closures of K1 and then Kp and K2 and then Kp. Then, the energy initially consumed to produce the elongation of the dual strip 75, complemented by the differential energy again created during the return of the dual strip 75 to the non-flexed position is restored to the source E. It must be noted that the energy transfer times from or to the magnetic circuit and hence the times of closure of the switches K1, K2 and Kp are very short (some μs) in relation to the mechanical motions (some ms) or coupling durations (some hundreds of μs).

Figure 12A:
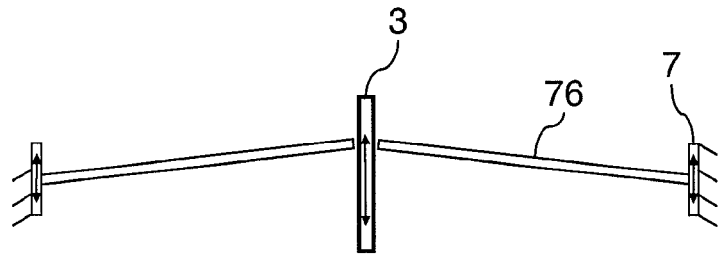

FIG. 12a schematically shows another embodiment of an amplification device 11. Piezoelectric strips 76 positioned so as to be facing each other are embedded by one end in the frame 7 and extend along a direction slightly inclined relatively to the perpendicular during the shifting of the mass 3. The strips 76 are controlled so that by applying an appropriate electrical voltage to them, they get elongated in the direction of the mass 3 until they grip it by their free end and ensure coupling between the frame 7 and the mass 3.

These strips 76 are designed to achieve a coupling of the mass 3 when it descends. Other strips not shown have an opposite orientation in order to achieve the coupling of the mass 3 when it rises.

Figure 12B:
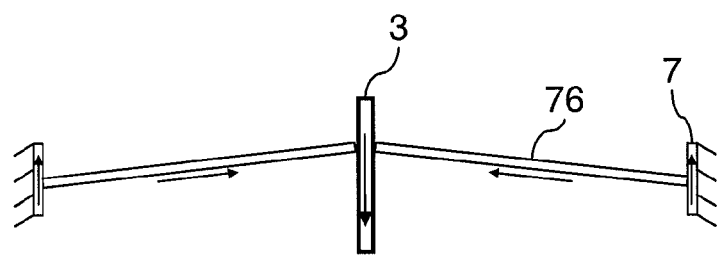
Figure 12C:
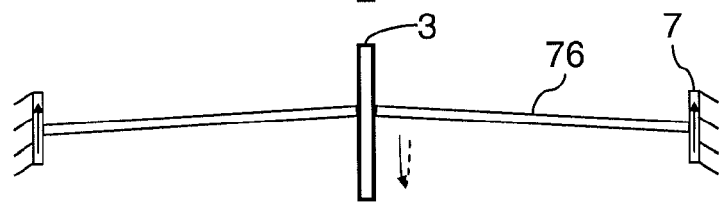
Figure 12D:
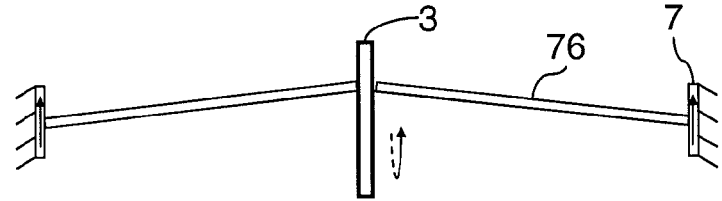
Figure 12E:
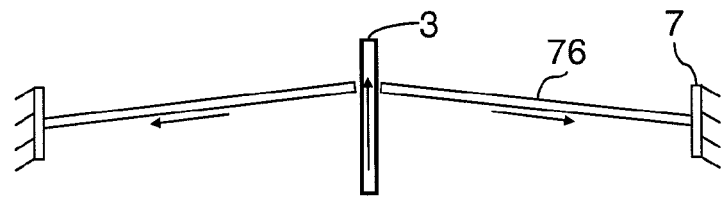

FIGS. 12b to 12e illustrate the working of the device 11 during different phases. In FIG. 12b, the mobile mass 3 gets shifted downwards while the frame 7 gets shifted upwards. During these opposite shifts, an elongation of the strips 76 is activated. The strips 76 then achieve the coupling between the frame 7 and the mobile mass 3. In FIG. 12c, the downward motion of the mass 3 continues transitorily, inducing a compression of the strips 76 because of their slight inclination relatively to the direction of shift of the mass 3. The mass 3 finally has zero speed relatively to the frame 7. Owing to the compression, the strips 76 give rise to a return spring effect. In FIG. 12d, the mass 3 shifts along the same orientation as the frame 7, under the effect of the driving by the frame 7 and the return spring effect of the strips 76. In FIG. 12e, the strips 76 are controlled to uncouple the mass 3 before the orientation of shift of the support 7 changes.

By using an appropriate command of the strips 76, it is possible to retrieve the electrical energy stored during their compression during the coupling.

FIG. 13 shows another embodiment of a vibration amplification device 11. This device 11 proves to be particularly appropriate for an embodiment using techniques for etching and machining silicon substrates. A mobile mass 3 is fixedly joined by two of its faces to flexible films 31 and 32. These films 31 and 32 form return springs of the mass 3 and also guide the mass 3 in translation along a direction perpendicular to their plane. The flexible films can for example be made of polyimide. The flexible films 31 and 33 are spaced out from one another by means of silicon layers 34 and 35 etched in the median part in order to house the mass 3. The layers 34 and 35 are fixedly joined respectively to films 31 and 33. A hollow 36 made out of silicon is fixedly joined to a vibrating support fixed beneath the film 33. A dip is etched in the median part of the base 36 in order to enable a play of the mobile mass 3. An added-on mass 13 is fixed on the upper part of the film 31. This mass 13 can be made out of metal (tungsten for example) in order to increase the mass in motion of the resonant system. The device 11 comprises a stack of layers 32 interposed between the silicon layer 34 and 35. The stack of layers 32 is shaped appropriately to form piezoelectric dual strips on either side of the mass 3. For an appropriate command, these dual strips stretch until they couple the mass 3 with the base 36. The dual strips could also be used for the conversion of kinetic energy of the mass 3 into electrical energy.

In the example of FIG. 14, the mass 3, the frame 7, secondary springs 8a and 8b are formed as a single unit. The single-unit element could for example be molded or made by etching of a silicon layer. In this example, the secondary springs 8a and 8b are formed by flexible struts embedded firstly in the mass 3 and secondly on the frame 7. These struts extend perpendicularly to the shifting of the mass 3. The mass 3 includes an added-on element 13 designed to increase the mass of the resonant system. This added-on mass 13 could be bonded to the silicon part of the mass 3. Two piezoelectric dual strips 12 are embedded by one end in the frame 7 and extend perpendicularly to the direction of shift of the mass 3. The dual strips 12 are positioned on either side of the mass 3 so that the forces that they apply to the mass 3 are compensated for. Their other end is designed to come selectively into contact with the mass 3 to couple it with the frame 7. As in the previous examples, the coupling between the frame 7 and the mass 3 takes place when their orientations of shift are opposite. The decoupling will take place when the orientations of shift of the frame and of the mass 3 are identical, preferably when the frame 7 reaches it maximum speed. The coupling and decoupling will be commanded electronically. The coupling could be made by applying a voltage to the dual strips 12 inducing their elongation until they come into contact with the mass 3. During the coupling between the support 7 and the mass 3, the piezoelectric dual strips 12 could act as springs in bending under the effect of the kinetic energy of the mass 3. During the bending of such dual strips 12, the piezoelectric components store electrical energy. By selectively connecting the dual strips 12 to an appropriate circuit, it is thus possible to convert the kinetic energy of the mass 3 into electrical energy.

FIG. 15 illustrates another variant of an amplification device 11. In this example, the mass 3, the frame 7, a return spring 4 and secondary springs 8a and 8b are formed as integral single-piece units. The single-piece element will advantageously be made by etching of a silicon layer. In this example, the secondary springs 8a and 8b are formed by flexible struts embedded firstly on the mass 3 and secondly on the frame 7. These struts extend perpendicularly to the shifting of the mass 3. The return spring 4 is made in the form of a strut embedded at both ends on the support 3, extending perpendicularly to the shifting of the mass 3. The stiffness of the spring 4 is far greater than the stiffness of the secondary springs 8a and 8b. The mass 3 includes an added-on element 13 designed to increase the mass of the resonant system. A protruding part 14 is embedded in the median part of the strut of the spring 4 and extends in the direction of shift of the mass 3. A coupling member includes jaws 15, fixedly joined to the frame 7. The jaws 15 selectively couple the protrusion 14 to the frame 7.

As in the previous examples, the coupling between the frame 7 and the mass 3 will take place when their orientations of shift are opposite. The decoupling will take place during a change of orientation of the mass 3 when the orientations of shift of the mass 3 and of the frame 7 are identical. The coupling and the decoupling will be commanded electronically.

FIGS. 15 to 20 represent different embodiments of coupling members between the mass 3 and a frame or a support. In these examples, the coupling members grip a protrusion 14 fixedly joined to the mass 3 but the coupling can of course be done on another element fixedly joined to the mass 3.

Figure 16:
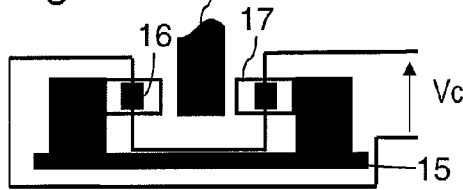
Figure 17:
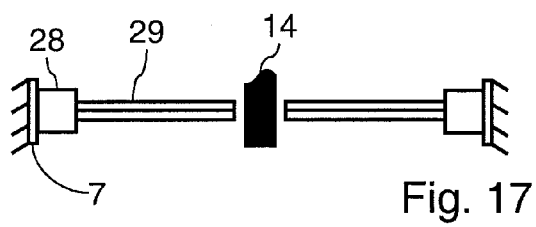

FIG. 16 shows jaws 15 provided with gripping elements 17 having a high coefficient of thermal expansion. Heating resistors 16 are embedded inside the gripping elements 17. When it is desired to coupling the frame 7 to the protrusion 24, a control voltage is applied to the terminals of the heating resistors 16. Thereupon, the gripping elements 17 expand until they grip and immobilize the protrusion 14. It is also possible to envisage the use of gripping elements made out of shape-memory materials. Such jaws 15 are relatively easy to make on a silicon support. The actuation of the jaws requires relatively little energy and a relatively low power supply voltage to cause an expansion enabling the protrusion 14 to be gripped.

Such jaws 15 do not however make it possible to achieve a conversion of kinetic energy into electrical energy. The variant of FIG. 17 thus combines elements with high coefficients of thermal expansion 28 with piezoelectric dual strips 29. The elements 28 are embedded in the frame 7 and their expansion is controlled by electrical resistors. The dual strips 29 are embedded by one end in the elements 28. During the expansion of the elements 28, the free end of the dual strips 29 comes into contact with the protrusion 14 to generate the coupling. According to the principle described in detail here above, the electrical energy stored during a deformation of the dual strips 29 by the kinetic energy of the mass 3 during a coupling can be retrieved by an electrical circuit.

Figure 18:
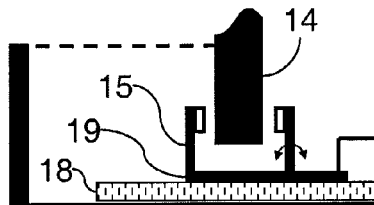

FIG. 18 represents another alternative coupling member. In this alternative embodiment, a conductive element 20 is fixedly joined to the frame. The jaws 15 are made in a conductive socket 19. The jaws are placed on either side of the protrusion 14. The protrusion 14 is itself conductive and is connected to the element 20. The socket 19 is separated from the conductive element 20 by means of an insulator layer 18. When a difference in voltage is applied between the socket 19 and the element 20, the jaws 15 get deflected and get placed against the protrusion 14 because of electrostatic forces.

Figure 19:
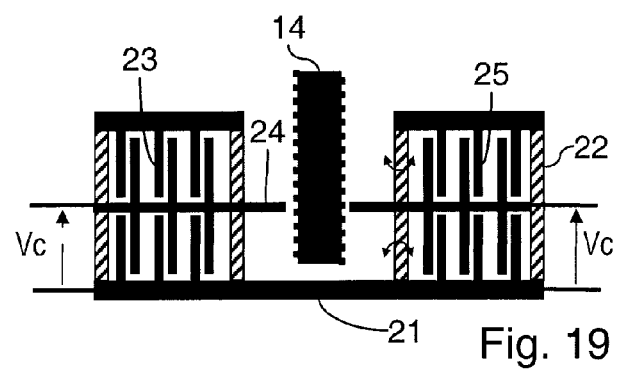

FIG. 19 represents another variant of a coupling member. In this variant, the coupling member comprises a conductive element 21. This element 21 is fixedly joined to a vibrating support. This element 21 is fixedly joined and connected to conductive plates 25. Conductive plates 23 are placed so as to be facing conductive plates 25. These plates 23 are crossed in their median part by locking rods 24. The rods 24 are mounted so as to be mobile in translation relatively to the element 21 by means of flexible and insulating walls 22. The deflection of the walls 22 enables a shift in translation perpendicularly to the direction of shift of the protrusion 14. When a voltage difference across the plates 23 and the plates 25 is applied, an electrostatic force shifts the plates 23 relatively to the plates 25. The rods 24 then shift until they get engaged in notches demarcated by bulges and made in the protrusion 14. Thereupon, the rods 24 are coupled with the protrusion 14. Advantageously, the notches made on either side of the protrusion 14 are offset along the direction of shift of this protrusion 14: thus, the resolution of the notches will be increased since the rod 14 can get inserted in a notch if the opposite rod 14 abuts a bulge. It is also possible to greatly increase the number of coupling members along the protrusion 14 or on other protrusions. Shifting each member differently with respect to the notches increases the probability that at least one of the rods 14 of the organs will meet a notch at the time of the coupling command. The end of the rods 14 could also be thinned to facilitate their entry into the notches.

Although insulating walls 22 have been illustrated, they can also be conductive by moving away the electrical insulation. The walls 22 and the plates 25 are fixed to an insulating support. The wall 22 and the plates 25 will then be electrically insulated by means of this support.

Figure 20:
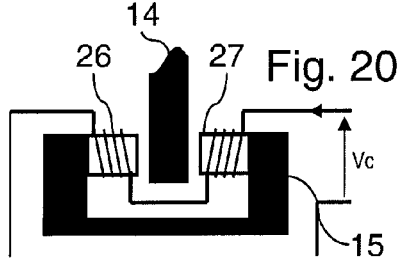

FIG. 20 represents yet another variant of a coupling member. In this variant, the jaws 15 are provided with gripping elements 27, made out of magnetostrictive materials. The gripping elements 27 are surrounded by coils 26. When a voltage difference is applied across the terminals of the coils 26, the gripping elements 27 get expanded and grip the protrusion 14 to immobilize it.

For each of the coupling devices, it is advantageous to have a small spacing (for example a spacing of a few μm) between said actuator or actuators and the mobile part, in order to limit the travel of the actuator and therefore the energy needed to produce the coupling.

Besides, when the support or its interface for fastening the amplification device is provided with an accelerometer, it will advantageously measure the amplitude of the acceleration undergone. Indeed, if the vibratory energy of the support is insufficient to transfer sufficient energy into the mobile mass, the working of the coupling member will be deactivated so that the device does not consume more electrical energy than it produces.

Although the embodiments described here are based on movements of translation of the mobile mass, it is also possible to apply the invention to mechanical amplification devices based on rotational movements or components of the mobile mass.

The invention claimed is:

1. An apparatus for amplifying a vibratory movement, said apparatus comprising a micromechanical device, said device comprising: an interface for fixedly joining the device to a vibrating member; a mass mounted so as to be mobile in at least one degree of freedom relative to the interface; a spring capable of exerting a return force between the mobile mass and the interface; an orientation-detecting member for detecting the orientation of the shift of the interface according to said degree of freedom; and a coupling member for coupling the mobile mass to the interface, wherein said coupling member is configured to couple the mobile mass to the interface when an orientation of shift of the interface is opposite that of the mobile mass and wherein said coupling member is configured to uncouple the mobile mass from the interface before a change in orientation of the interface and when the orientation of shift of the interface is identical to that of the mobile mass.

2. The apparatus of claim 1, wherein the mass is mobile in translation relative to the interface, and wherein the coupling member comprises a counterweight mounted so as to pivot relative to an axis perpendicular to the axis of translation of the mass with an imbalance, the counterweight being mounted so as to pivot between two positions in which the mass is coupled to the interface for respective orientations of shift of the mass relative to the interface.

3. The apparatus of claim 1 wherein the mass comprises a coupling part having an alternation of notches and bulges, and wherein the coupling member comprises an actuator for insertion into a notch of the coupling part during a coupling.

4. The apparatus of claim 1 further comprising a member for converting mechanical energy of the mobile mass into electrical energy.

5. The apparatus of claim 1 further comprising a vibrating support fixedly joined to the interface of the micromechanical device, the vibrating support having a mass at least fifty times greater than that of the micromechanical device.

6. The apparatus of claim 1, wherein the device further comprises a speed detecting member for detecting a maximum speed of the interface, and wherein the coupling member is configured to couple the mobile mass to the interface when the interface reaches a maximum speed.

7. The apparatus of claim 6, wherein the orientation-detecting member and/or the speed-detecting member comprises an accelerometer, wherein the coupling member comprises an electrically controlled actuator, and wherein the device further comprises a processing device for controlling the actuator according to measurements given by the accelerometer.

8. The apparatus of claim 7, wherein the maximum speed is detected as a function of the increase or of the decrease of the acceleration when the acceleration passes through a zero value.

9. The apparatus of claim 1 wherein the interface and the mobile mass comprise grooved conductive surfaces facing each other to form a capacitor, and wherein the device comprises a control circuit for selectively applying a voltage between the grooved surfaces to couple or uncouple the interface and the mobile mass.

10. The apparatus of claim 9, wherein the control circuit is configured to discharge and store selectively the charge included in the capacitor formed by the grooved conducting surfaces.

11. The apparatus of claim 1 wherein the mass is mobile in translation relative to the interface, and wherein the coupling member comprises a piezoelectric element controlled so as to stretch in a direction perpendicular to the direction of shift of the mass so as to couple the mass to the interface.

12. The apparatus of claim 11, wherein the piezoelectric element extends along a direction perpendicular to the direction of shift of the mass, and wherein the piezoelectric element is flexible so as to form said spring during the coupling.

13. The apparatus of claim 1 wherein the interface, the mass, and the spring comprise a common element, said common element being formed as a single-piece unit in a silicon substrate.

14. The apparatus of claim 13, wherein the mass comprises an added-on element fixed to the single-piece unit.

15. The apparatus of claim 13, wherein the spring is formed by a flexible strut made in the single-piece unit.

16. A method for amplifying the movement of a vibrating element by means of a mechanical device, said method comprising: providing a micromechanical device mounted with a mass mobile in at least one degree of freedom relative to the vibrating member and provided with a spring capable of exerting a return force between the mobile mass and the vibrating element; detecting the orientation of the shift of the interface according to said degree of freedom; coupling the mobile mass to the vibrating member when the orientation of shift of the interface is opposite that of the mobile mass, and uncoupling the mobile mass from the interface before a change in orientation of the vibrating member and when the orientation of shift of the interface is identical to that of the mobile mass.

* * * * *